United States Patent [19]

Stanford et al.

[11] Patent Number: 4,722,497
[45] Date of Patent: Feb. 2, 1988

[54] VARIABLE AND NORMALLY OPEN VENTED PARACHUTE DEVICE AND METHOD OF USING AND CONTROLLING A PARACHUTE DEVICE

[76] Inventors: John D. Stanford, 602 Lookout Dr., Apt. 117, Richardson, Tex. 75080; Phillip B. Huff, 304 D Miners Creek Dr., Frisco, Colo. 80443

[21] Appl. No.: 735,657

[22] Filed: May 20, 1985

[51] Int. Cl.$^4$ .............................................. B64D 17/20
[52] U.S. Cl. ..................................... 244/152; 244/145; 280/810
[58] Field of Search ................... 244/142, 145, 151 B, 244/152; 280/213, 810

[56] References Cited

U.S. PATENT DOCUMENTS

| | | | |
|---|---|---|---|
| 1,104,995 | 7/1914 | Luki | 244/152 |
| 2,116,037 | 5/1938 | Nonaka | 244/152 |
| 2,644,656 | 7/1953 | Zbock et al. | 244/152 |
| 3,193,222 | 7/1965 | Davies | 244/145 |
| 3,515,362 | 6/1970 | Richardson et al. | 244/142 |
| 4,127,247 | 11/1978 | Strasilla | 244/152 |

FOREIGN PATENT DOCUMENTS

| | | | |
|---|---|---|---|
| 344591 | 11/1921 | Fed. Rep. of Germany | 244/152 |
| 475770 | 9/1969 | Switzerland | 280/810 |

*Primary Examiner*—Joseph F. Peters, Jr.
*Assistant Examiner*—Rodney Corl
*Attorney, Agent, or Firm*—Henry C. Kovar

[57] ABSTRACT

A parachute device primarily for propulsion of a work load, specifically a snow skier who wants to go across flat terrain or uphill, has a canopy with a leading annulus and a normally open apex vent having a plurality of wedge shaped panels secured on one side to the annulus, each panel has a tip with an apex ring, a plurality of suspension lines lead from the annulus to a control center, a vent control line extends from the control center to each panel apex ring and the control line has a vent control ring which causes the control line to pull the panel apex rings together in an apex of the canopy, the control center has a motor driven reel for taking in the control line and a one-way brake on the reel enables letting out of the control line when a manual brake release is manipulated, a safety release in one side of the control center has structure for release of a fraction of the suspension lines for instant deflation of the canopy and a complete release system on a load harness has structure for instant complete release of the canopy and control center from the work load. A method of varying the output of a normally open and vented parachute has the steps of inflating the canopy while the vent is open, then incrementally closing the vent to get the desired output from the canopy, and taking up a control line used to close the vent, the control line is held tauntly so that the vent cannot reopen until the control line is released, these steps may be used for propulsion of a snow skier up a hill with a parachute device.

35 Claims, 10 Drawing Figures

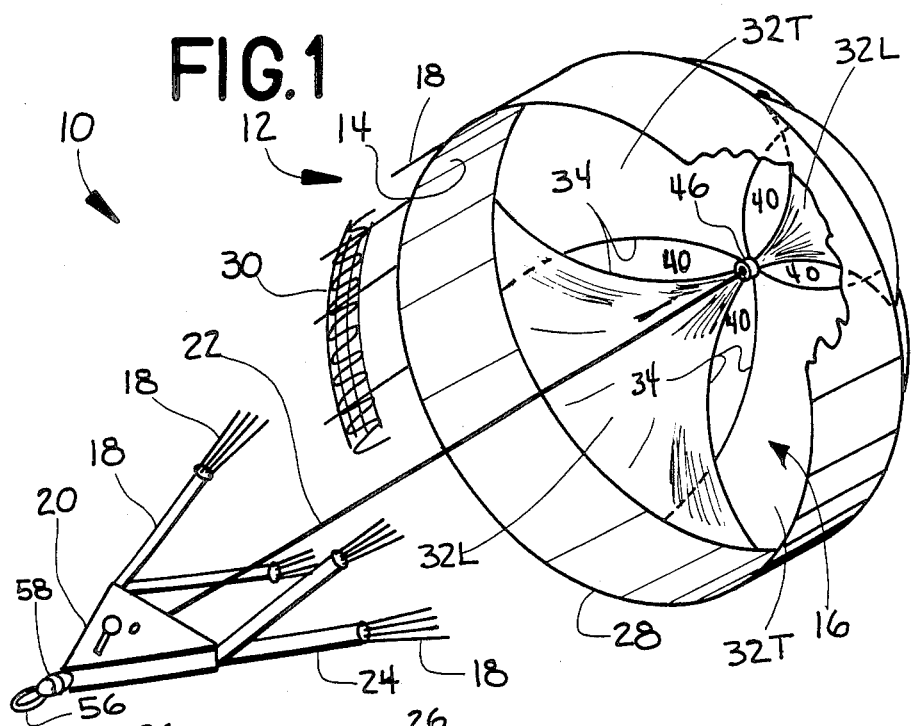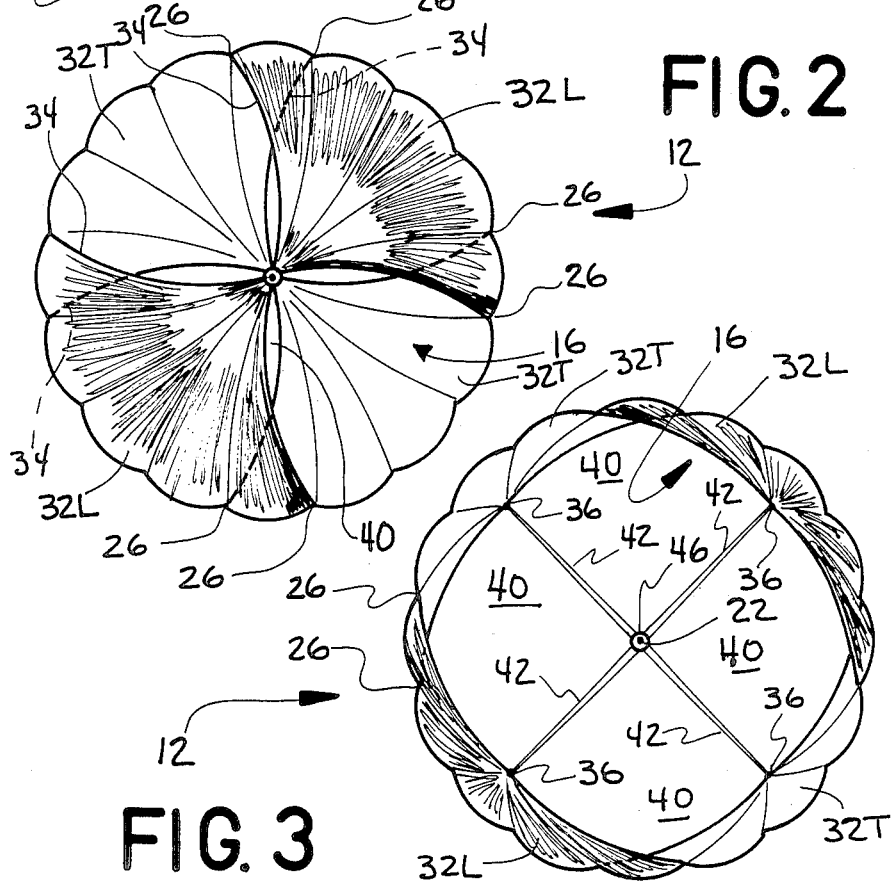

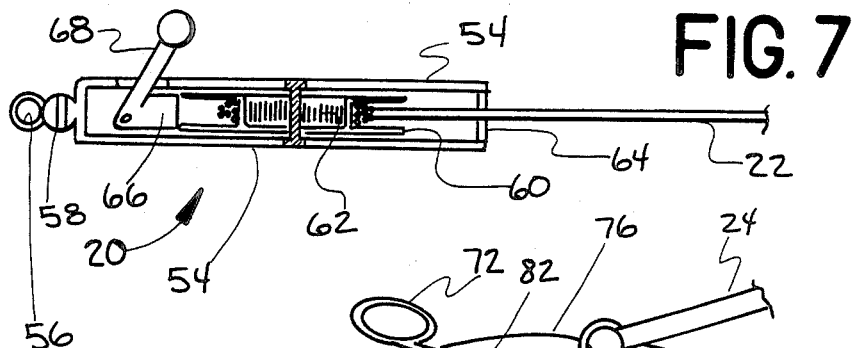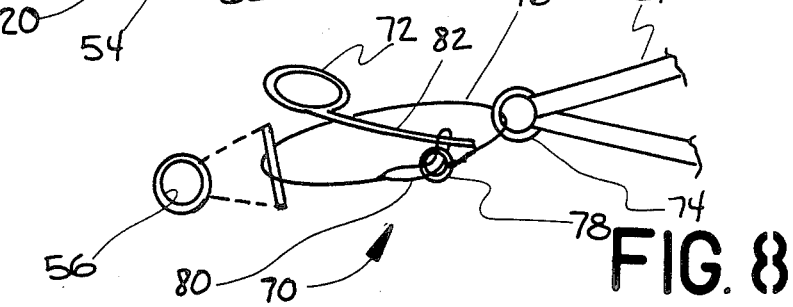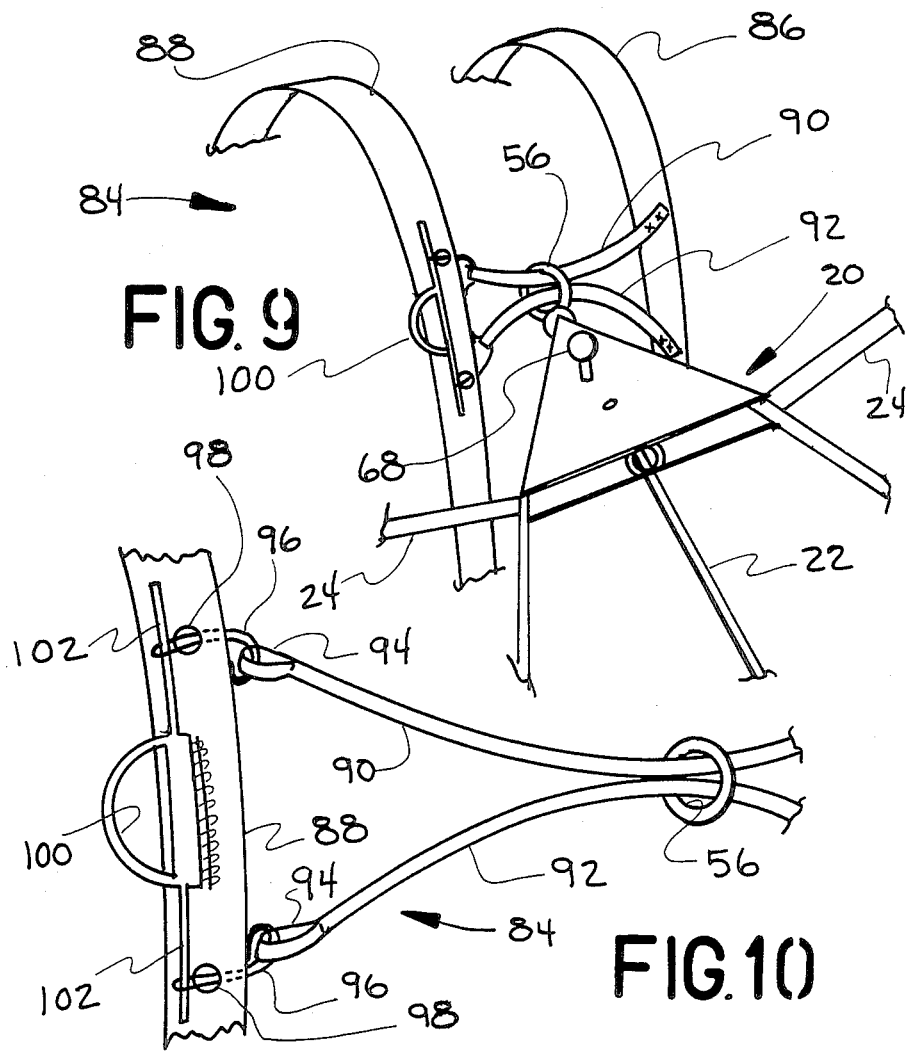

VARIABLE AND NORMALLY OPEN VENTED PARACHUTE DEVICE AND METHOD OF USING AND CONTROLLING A PARACHUTE DEVICE

BACKGROUND OF THE INVENTION

1. Field of the Invention

This invention pertains to a normally open vented parachute having a control center and structure for incrementally closing the vent, to a propulsive parachute for a work load such as a snow skier who wants to go uphill, to a method of controlling a normally open and vented parachute, and to a method of propelling a work load such as a skier, with a parachute device.

2. The Prior Art

The use of a parachute device for propulsion of a work load is known and has been done before.

U.S. Pat. No. 4,127,247 by Dieter Strasilla of Germany is the most pertinent known prior effort at a device of this type. Strasilla has a parachute which is connected to a skier by his invention of a quick release lock, and control lines to sides of the chute are provided for directional control.

The use of controlled vents in parachute devices is also known and has been done before.

S. Nonala U.S. Pat. No. 2,116,037 has a normally closed apex vent which can be selectively in incrementally open with a control line to increase the rate of decent.

L. J. Davies U.S. Pat. No. 3,193,222 has a normally closed apex vent with wedge shaped apex panels. Upon excessive load of the canopy, the vent breaks open when a fuse tie breaks. This device is a single usage structure and the vent cannot be reclosed while in operation.

W. E. Tingle U.S. Pat. No. 2,127,895 has a normally closed apex vent that can be selectively opened with a center pull control line for increasing the rate of decent.

R. Karpf U.S. Pat. No. 3,152,782 and A. A. Barton U.S. Pat. No. 1,477,163 are more or less functionally equivalent to Tingle, with a different vent valve structure.

Other known prior art of lesser pertinence consist of:
A. D. Centofanti: U.S. Pat. No. 3,806,070
E. D. Vickerey: U.S. Pat. No. 3,498,566
C. Rohulick: U.S. Pat. No. 2,404,659
R. V. Pence: U.S. Pat. No. 2,399,379

All of the known prior endeavors utilize a normally full parachute and the control, if any, is for opening the vent and decreasing output of the canopy.

If and when these devices are used as propulsive units, they have no safety provisions, for deflation in the event of an emergency, other than to completely release the canopy as is one by Strasilla.

There are no structures for gently increasing the output of the canopy. For example, upon initial inflation of Strasilla's canopy you have 100% output. You cannot decrease the output to ease the shock or to slow down. You go wide open or not at all. To stop you have to release the canopy. If the suspension lines become fouled on your body or equipment, you cannot even release the canopy.

When skiing, there are such things as cliffs, trees, rocks, crevasses, stuck skiers, falls and the like that have to be expected and confronted with technique.

Strasilla has no structure or method for solving these adversities of travel with a parachute propulsive device. Further, a person wants to have a gentle start, be able to speed up and/or slow down, keep pace with a companion, stop either gently or immediately and, in general, be in complete control of self destiny. A person also wants to be able to utilize the device in varying winds, be they high, low, or gusty. While Strasilla may be suitable for crossing an un-obstructed frozen lake, his structure is essentially unusable on hills or mountains or in obstructed topography.

OBJECTS OF THE INVENTION

It is an object of the present invention to provide a variable vent parachute that is non fouling.

It is an object of the present invention to provide a parachute having structure for taking in and letting out a vent control line.

It is an object of the present invention to provide a variable vent parachute having a new apex vent and control line for closing the vent.

It is an object of the present invention to provide a normally vented parachute having structure for selectively closing a normally open vent.

It is an object of the present invention to provide an improved parachute structure having a vent and structure for selectively and incrementally controlling the vent opening.

It is an object of the present invention to provide a propulsive parachute device for imparting velocity to a work load; the work load is preferably a snow skier who wants to go across flat land or up an incline.

It is an object of the present invention to provide a propulsive parachute device having an improved safety release system.

It is an object of the present invention to provide a propulsive parachute device having structure for controlling a vent in the canopy.

It is an object of the present invention to provide a propulsive parachute device having a normally vented canopy that is selectively closable for inflation and to develop work force.

It is an object of the present invention to provide a method of varying the output of a ventable parachute.

It is an object of the present invention to provide a method of varying the output of a normally open parachute.

It is an object of the present invention to provide a method of propelling a work load with a parachute.

It is an object of the present invention to provide a method of parachute propulsion for a work load, such as a skier going up a hill or across flat terrain.

It is an object of the invention to provide a parachute propulsion device and method that can be used by a snow skier to go up a hill, mountain, across a frozen lake or flat land in a reasonable, safe, and controlled manner.

These and other objects of the present invention will become manifest to those versed in the art upon reviewal of the teachings herein.

SUMMARY OF THE INVENTION

According to the principles of the present invention a variable vent parachute has a canopy with a leading annulus and an adjustable apex vent, suspension lines, a control center, a vent control line, and structure in the control center for taking in and letting out the vent control line.

A variable vent parachue has a canopy with a leading annulus, suspension lines, a control center, a paneled apex vent, a vent control line from the control center to panels of the vent, and structure with the control line for closing the panels when the control line is pulled in.

A normally vented parachute has a canopy, suspension lines, a control center, a normally open apex vent, a vent control line, and control line tightening structure in the control center for mantaining the control line taunt.

A propulsive parachute device has a canopy, suspension lines, a control center, a control line from the center to te vent, and a safety release on the control center for quick release of a fraction of the suspension lines to immediately deflate the canopy.

A propulsive parachute device has a canopy, structure for attaching the canopy to a work load, a control center, a control line from the center to a normally open vent in the canopy, and structure in the control center for control of the line.

A method of varying the output of a ventable parachute has the steps of inflating a canopy while it is mostly open and vented, pulling in a control line and closing a vent in the canopy, and taking up and storing the control line as it is pulled in.

A method of varying the output of a normally open parachute has the steps of selectively and incrementally closing the vent of a normally open and vented parachute, and mono-stabely securing the vent in any selected incremental position so the vent cannot reopen until the securement is released.

A method of propelling a work load with a parachute has the steps of securing a normally open and vented parachute to a work load, partially closing a canopy vent and inflating the canopy, further closing the vent and imparting velocity to the work load with force developed by the parachute, and selectively and incrementally further closing or opening the canopy to decrease or increase velocity of the work load.

BRIEF DESCRIPTION OF THE DRAWINGS

FIG. 1 is a schematic illustration of the preferred embodiment of the parachute device of our invention;

FIG. 2 is an elevational view looking into the inflated and closed canopy of the structure of FIG. 1;

FIG. 3 is an elevational view looking into the inflated and opened canopy of the structure of structure of FIG. 1;

FIG. 7 is a sectional view through lines VII—VII of FIG. 6;

FIG. 8 is a schematic detail of the safety release of FIG. 6;

FIG. 9 is a schematic view of the complete safety release of and for the structure of FIG. 1; and FIG. 10 is a schematic detail of the structure of FIG. 9.

DETAILED DESCRIPTION OF THE PREFERRED EMBODIMENT

Figure 4:
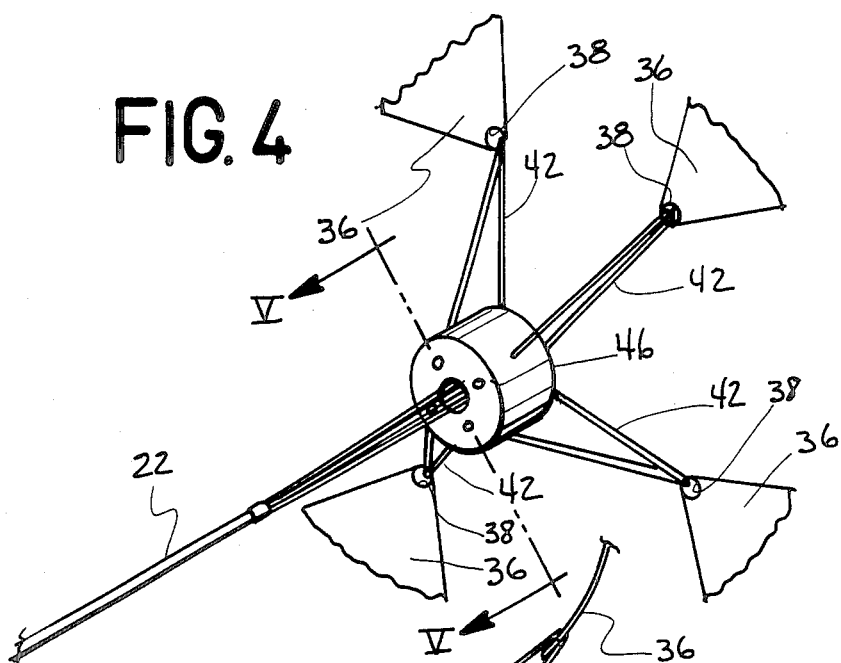
FIG. 4 is a detailed view of the vent control of the structure of FIG. 1.

The preferred embodiment of the parachute device of the present invention is illustrated in FIG. 1 and generally indicated by the numeral 10. The device 10 has a canopy generally indicated by the numeral 12 and having a leading annulus 14 and a vent structure generally indicated by the numeral 16, a plurality of suspension lines 18, a control center 20 and a vent control line 22.

The device 10 has been structured specifically for pulling a snow skier up an incline in a controllable and safe manner, but other presently unanticipated uses are expected to be realized.

An important feature of the present invention is the normally open canopy 12 which is referred to as normally open because the vent structure 16 is open and tends to remain open and must be restrained to a closed position against its natural bias to be open. The suspension lines 18 are preferably about sixteen in number and are divided into four groups of four lines each, each group runs into a seven foot long riser 24 which is effective to keep the suspension lines 18 away from the hands, feet, ski boots, skies and the like of the user. Each individual suspension line 18 runs into an attachment point 26 on a leading edge 28 of the annulus 14 and an anti-inversion net 30 (part of which is shown) is forward of the leading edge 28. The spacing between each of the attachment points 26 is generally identical. The normally open vent structure 16 has a plurality of wedge shaped panels 32. There preferably is an even number of panels 32 and the preferred embodiment has four panels 32. Each panel 32 has a leading on edge secured to the annulus 14 and the two free sides or edges 34 converge at equal angles to a panel apex or tip 36 where each panel 32 has an apex ring 38. Adjacent panels 32 are structured to overlap each other as best shown in FIGS. 1–3. There are leading panels 32L which are every other panel 32 and in the case of for panels 32 they are opposite panels 32L, 32L. Were there to be six panels 32, the leading panels 32L would be every other panel 32. Behind the leading panels 32L are trailing panels 32T. Each adjacent leading panel 32L and trailing panel 32T overlap the length of one arcuate geometrical cord between adjacent suspension line attachment points 26. Each of the panels 32L, 32T has an identical arcuate width. The length of each panel 32 is sufficient to form a convention hemispherical parachute shape when the panel apexes 36 are pulled together as shown in FIGS. 1 & 2. The normal configuration of the canopy 12 is best shown in FIG. 3 where the panels 32 trail the annulus 14 and the vent opening 40 has an area of almost but just slightly less than the area within the annulus 14. In this configuration the force output of the canopy 12 is minimal but sufficient to effect and maintain inflation of the canopy 12. When the vent structure 16 is completely closed as shown in FIGS. 1 & 2, there remains small vent opening 40 between those shown in FIGS. 2 & 3 and likewise the vent opening 4 can be any incremental size between those shown in FIGS. 2 & 3.

Figure 5:
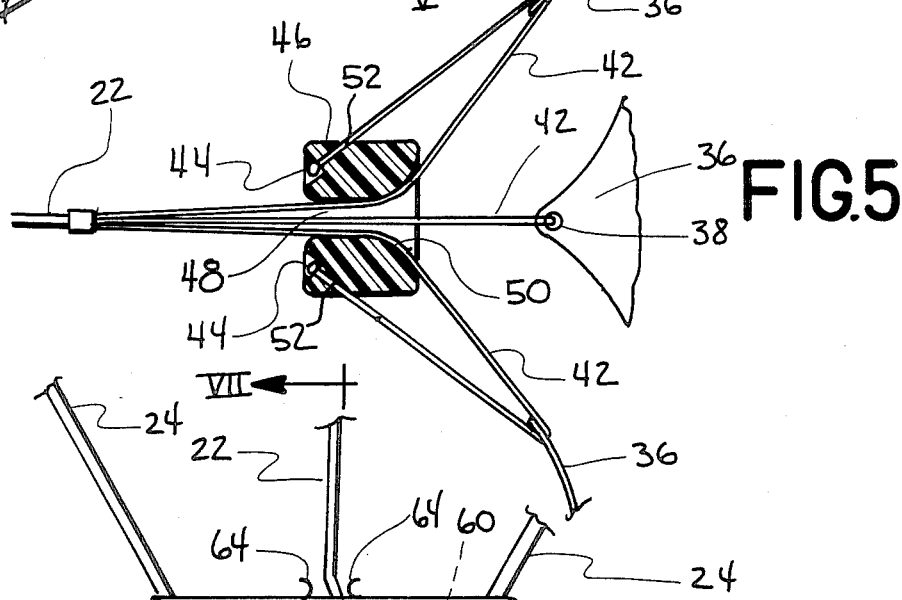
FIG. 5 is a sectional detail through lines V—V of FIG. 4.

Another important feature of the invention is the control line 22 and its interface with the vent panels 32 is best shown in FIGS. 4 & 5. The vent line 22 splits into a discrete outer vent line 42 for each panel 32. The outermost end 44 of each outer vent line 42 is secured to a vent control ring 46 through which all of the outer vent lines 42 are threaded. The control ring 40 has a central guiding aperture 48 with a larger radius outlet 50 having ever increasing divergency. The outer vent lines 42 are all equi-length and are threaded through the control ring aperture 48 and to and through the panel apex rings 38 from the trailing side, and then forward to a respective bore 52 in the control ring 46. When the vent control line 22 is loose the vent panels are all equally open as shown in FIG. 3. When the control line 22 is pulled taunt and pulled in, each panel apex 36 is pulled toward the control ring 46. The outer vent line 42 arrangement gives a two-to-one reduction of travel or two-to-one increase of tension depending upon how you look at it. For each unit of travel of the singular portion of the vent control line 22, each vent apex 36 will move one-half unit with respect to the vent control ring 46.

Figure 6:
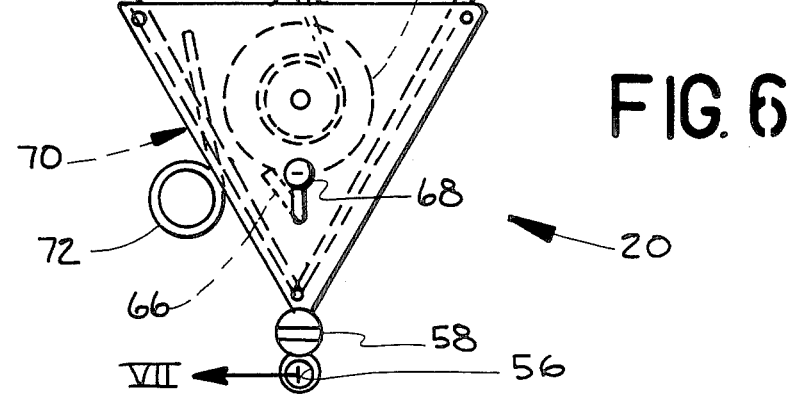
FIG. 6 is a top plan view of the control center of the structure of FIG. 1.

Another important feature of the invention is the control center 20 which is best shown in FIGS. 6 & 7. The control center has a pair of spaced apart and parallel generally triangular control plates 54. The plates 54 as are the suspension lines 18, are eventually connected to a load link 56 through a swivel 58. The control center 20 has a pulley or reel 60 powered by a motor 62. The motor 62 is preferably a spring motor. The vent control line 22 comes into the control center 20 through a guide 64 and is then wound on the reel 60. The motor 62 turns thereel 60 so that the reel 60 takes in or takes up the control line 22. The reel 60 and therefore the control line 22 are normally held by a one-way brake 66 which can be released by a manual brake release actuator 68. The reel 60 and motor 62 automatically take in the control line 22 but the brake 66 must be released for the control line 22 to be let out.

An important safety feature of the present invention is the fractional suspension line safety release shown in FIG. 8 and generally indicated by the numeral 70. The release 70 is built into the control center 20 on the left side where the release handle 72 can be found, grasped and pulled. The left side risers 24 have a one-inch diameter eye 74 on the end. The eye 74 is ultimately secured to the load link 56 by a loop line 76. The loop line has a half-inch eye 78 on one end which will go through the riser eye 74 and the second end has a closed loop 80. The closed loop 80 is threaded through the eye 78 and a release tail 82 from the handle 72 is then threaded through the closed loop as shown. In the case of an emergency the handle 72 and its release tail 82 can be pulled out and the loop line 76 lets go and half of the suspension lines 18 are released and the canopy 12 immediately deflates. However, the canopy 12 is still secured to the load by the right side risers 24. The release 70 must control a significant fraction of the suspension lines 18, preferably half, so that when its used the canopy 12 immediately deflates.

Another important feature of the present invention is the back up safety system and complete release system shown in FIGS. 9 & 10 and generally indicated by the numeral 84. A left harness strap 86 and right harness strap 88 are positively secured to the work load, specifically the skier. An upper load strap 90 and lower load strap 92 are positively secured to the left harness strap 86, and each load strap has a free end with an eye 94. Each eye 94 has through it a closed loop 96 whih is positively secured to the right harness strap 88. The closed loop 96 is threaded through the strap eye 94 and then through a harness eye 98. A complete release handle 100 is frictionally secured to the right harness strap 88 with a hook and loop fastener. The handle 100 has a pair of release tails 102 which each extend through the closed loops 96. In the case of extreme failure or emergency, the complete release handle 100 is pulled with the right hand and when the tails 102 are pulled out the closed loops 96 and load straps 90, 92 are set free, and the load link 56 and the control center 20 and canopy 12 all disconnect from the work load.

This structure and the method of its operation gives a multiple back-up safety system to prevent run-aways, collisions, knock-downs and the like. Firstly, the canopy 12 will not pull by itself, it must have its vent panels 32 closed before it will do effective work. Secondly, the brake 68 immediately lets the vent structure 16 open with either hand of the user. Thirdly, the canopy 20 can be immediately deflated by pulling the suspension line release 70 with the left hand. Fourthly, the entire canopy 12 and control center 20 can be unhooked by pulling the complete release 84 with the right hand. Actually either release system 70, 84 can be pulled with either hand.

The control center 20 is within and is centered within the suspension lines 18, in this regard the risers 24 are considered to be the rear of the suspension lines 18. The control center 20 can always be found by the user and its toward the canopy 12. The control line 22 is always kept within the suspension lines so it does not become entangled. If any lines tangle in a tree or obstacle, it will be the suspension lines 18 first and not the control line 22.

In the use of the device 10 and in the practice of the method of the present invention, the canopy 12 is secured to a work load (not shown, but preferably the previously mentioned skier) by connection of the load link 56. If connected to a skier, the safety connection and release of FIGS. 9 & 10 will be used. The structure and operation of this release 84 has been previously described. The vent structure 16 will be in its normally open configuration as shown in FIG. 3 or it may even be more open depending upon the geometry of the control line 22, control ring 46 and outer vent lines 42. The control line 22 is manually pulled in, specifically the skier will grasp the control line with his hands and pull it in. The reel 60 and motor 62 will automatically take-up or take-in, call it what you may, the pulled in portion of the control line 22. The vent panels 32 willl begin to close and the canopy 12 will inflate. When the canopy 12 is initially inflated, it will produce little or no useful work force, however, it is inflated and upright and the constant diameter annulus 14 will have taken the form shown in FIG. 1. As the control line 22 is selectively and incrementally pulled in the vent panels 32 begin to close and the canopy 12 begins to produce a useful work force on a graduated and gentle basis rather than as all or nothing. As the control line 22 is taken in, the real 60 and motor 62 again take up the pulled in portion of the control line 22 and the skier is not knocked off his feet. This totally eliminates the possibility of the control line 22 fouling on the work load, specifically the skier and the skiing equipment, and makes certain the control line 22 is always free to be instantly let out to reduce force output of the canopy 12.

As the work load starts to move, the control line 22 can again be selectively and incrementally pulled in to further close the vent structure 16 and increase the force output of the canopy 12. If less speed or force is desired, actuation of the brake release 68 lets the reel 60 go backwards and the control line 22 goes out and the vent structure 16 opens itself and the canopy 12 produces less force and the work load slows down or stops.

The real 60, motor 62 and brake 66 mono-stably restrain the control line 22, specifically they take the control line 22 in freely, but restrains it and do not let it out until the brake 66 is released by the user of the device 10.

If something goes wrong, either of the releases 70, 84 can be used, or the suspension line releases 70 can be used first and the complete release 84 used secondly.

The device 10 and the method described herein are thought to be extremely useful and promising, firstly for recreation, secondly, for productive endeavors and thirdly, for military purposes. The device 10 leaves no trail or damage, it uses no fuel, it is odorless and leaves no contamination, it is essentially noiseless, it is extremely safe compared to the prior endeavors.

It is also absolutely phenomenal to watch and to use for propulsion in the sport of snow skiing. After a skier has gone up the mountain with the device 10, the skier disconnects the device 10, folds it up and places it in a back pack and skies down the mountain. The device 10 enables skiing of normally unusual terrain without the expense of a helicopter. The device 10 may also be used with mountaineering ski equipment for traverse of extensive terrain. The device 10 may also have military usage in as much as it's silent, gives off no detectable radiation or emissions, and requires no fuel or logistic support.

The control center 20 with the reel 60 and brake 68 mechanism enables the skier to travel with the device 10 with "hands off".

We fully expect that many other advantages and usages will be found and realized, and that various modifications may be suggested by those versed in the art, however, be it understood that we wish to and do hereby claim and embody within the scope of the patent warranted hereon, all such embodiments as reasonably and properly come within the scope of our contribution to the art.

We claim as our invention:

1. A variable normally open vented when under load parachute comprising:
   (a) a parachute canopy having a leading annulus and normally open under load apex vent means for adjustably opening and closing an apex of the canopy;
   (b) a plurality of suspension lines each having a first end connected to a leading edge of the annulus and a second end ultimately connected to a load link;
   (c) a control center adjacent and secured to a canopy side of the load link and between the load link and the canopy;
   (d) a vent control line extending from the control center to the vent means; and
   (e) means in said control center for automatically taking in and selectively holding in said vent control line.

2. The parachute of claim 1, in which said taking means comprises an automatic reel in the control center, said reel having an automatic motor for automatic wind up of the control line.

3. The parachute of claim 2, in which said reel has a spring motor, said reel and motor being enclosed between a pair of parallel plates.

4. The parachute of claim 3 including a release actuator in said control center and between said plates.

5. The parachute of claim 1, in which the vent means comprises a plurality of discrete wedge shaped panels forming an apex of the canopy, said panels extending in from the annulus and said control line being connected to an inner apex of each panel, said panels each having a base edge sewn to the annulus and a pair of side edges not secured to either the annulus nor any other panel.

6. A variable normally vented under load parachute, comprising:
   (a) a canopy having a leading annulus;
   (b) a plurality of suspension lines each having a first end connected to the annulus and a second end ultimately connected to a load link;
   (c) a control center adjacent the load link and between the load link and the canopy;
   (d) a normally open under load apex vent in the canopy, said vent having a plurality of generally wedge shaped discrete panels, each panel having an outer central edge adjoined to the annulus and two edge extending to a panel apex that will reach the canopy apex, said two edges not being adjoined to any other panel;
   (e) a vent control line extending from the control center to the panel apexes; and
   (f) means with said control line for clsing the panels when the control line is pulled in, and for opening the panels when the control line is let out.

7. A parachute according to claim 6, in which the central edges of adjacent panels overlap each other.

8. A parachute according to claim 7, in which the central edge of at least one panel overlaps a minor portion of the central edge of at least one adjacent panel.

9. A parachute according to claim 7, in which there are four said panels, a pair of leading opposed panels overlapping in front of a pair of trailing opposed panels.

10. A parachute according to claim 7, in which there are an even number of said panels, there being leading panels spaced from each other by trailing panels.

11. A parachute according to claim 6 in which each panel central edge is of identical arcuate width on the annulus.

12. A parachute according to claim 6 including a vent opening between adjacent panels when the canopy and panels are completely closed and inflated.

13. A parachute according to claim 6, in which said panel closing means comprises:
   (a) a toroidal vent control ring having a central guiding aperture; and
   (b) a discrete outer vent line for each panel, each vent line extending from a distal end of a common portion of the control line and through the guiding aperture to a respective panel apex and then back to the control ring.

14. A parachute according to claim 13, in which each outer vent line is threaded and free to move through a panel apex ring.

15. A parachute according to claim 13, in which an outermost end of each outer vent line is secured to said control ring.

16. A parachute according to claim 13, in which said outer vent lines are equi-length.

17. A parachute according to claim 13, in which said ring aperture has a radiused outlet of continually greater divergency.

18. A normally vented when under load parchute, comprising:
   (a) a canopy having a leading annulus;
   (b) a plurality of suspension lines leading from the annulus to an ultimate connection to a load link;
   (c) a control center adjacent and connected to a canopy side of the load link;
   (d) normally open under load vent means for opening and closing an apex of the canopy;
   (e) a vent control line between the control center and the vent means; and
   (f) line control means in said control center for automatically taking in said control line and for selectively maintaining said control line taunt for adjustably closing said normally open vent and for selectively releasing said control line to open said vent.

19. A parachute according to claim 18, in which said control means comprises an automatic motor driven reel upon which the vent control line is wound.

20. A parachute according to claim 18, in which the control means is completely within the space defined by the suspension lines and the control center.

21. A parachute according to claim 18, in which said normally open uner load vent means is comprised of a plurality of discrete wedge shaped panels, each of which extends discretely from the annulus to a panel apex, said panel apexes being discrete from each other and being individually connected to said vent control line.

22. A propulsive normally vented under load parachute device comprising:
   (a) a canopy having a normally open under load vent therein;
   (b) a plurality of suspension lines leading from the canopy to ultimate attachment to a load link;
   (c) a control center between the load link and the suspension lines;
   (d) a control line extending from the control center to the vent;
   (e) safety release means on said control center for quick release of only a significant fraction of the suspension lines said fraction being sufficient to deflate the canopy.

23. The device of claim 22, in which the canopy has:
   (a) a leading annulus; and
   (b) a plurality of discrete wedge shaped vent panels extending from the annulus, each panel having a discrete and separated and free apex connected to the control line.

24. The device of claim 23, in which adjacent panels overlap each other where they adjoin the annulus.

25. The device of claim 22, in which the control cener is completely within the space defined by the suspension lines and the load link.

26. The device of claim 22, in which the control center has automatic means for taking up the control line.

27. The device of claim 22, in which the release means comprises:
   (a) a first eye on the fraction of the suspension lines,
   (b) a suspension safety line between the first eye and the load link, said safety line having
      (1) a second eye on one end, said second eye being passable through said first eye,
      (2) a loop at the second end, said loop being passed through said second eye, and
   (c) a cable tail through said loop and against the second eye, withdrawal of said tail from said loop releasing the safety line and the fraction of suspension lines and thereby deflating the canopy.

28. The device of claim 27, in which the safety line is inside of the control center.

29. A propulsive normally vented under load parachute device comprising:
   (a) a canopy having a normally open under load vent therein;
   (b) means for attaching the canopy to a work load;
   (c) a control center adjacent and secured to the canopy side of said attaching means;
   (d) a control line between the canopy vent and the control center for incrementally closing the vent to develope force and impart velocity to the work load; and
   (e) means in said control center for automatic take up and selective release of said control line.

30. A device according to claim 29, including complete release means for releasing the control center and the canopy from the work load in an emergency. comprising:
   (a) a load link on the control center;
   (b) at least one load strap extending through the load link, said strap having a first end secured to a load harness and a second free end having an eye thereon;
   (c) a looped safety line through the strap eye and through an eye of the load harness; and
   (d) a release tail through the looped safety line beyond the harness eye, withdrawal of said tail releasing the safety line and the load strap and the control center and canopy from the work load.

31. A device according to claim 30, including a double ended release tail and a pair of said load straps and safety lines, a pair of said harness eyes being spaced from each other with a handle for the tails being in between the harness eyes.

32. A method of varying the output of a normally vented under load parachute, comprising the steps of:
   (a) inflating the canopy of a parachute in a mostly open and vented configuration;
   (b) pulling in a control line and selectively closing a vent of the canopy; and
   (c) automatically taking up and storing the control line within the space defined by the physical confines of canopy suspension lines as the control line is pulled in.

33. The method of claim 32, including the step of braking the control line against release after it has been taken up.

34. The method of claim 33 including the step of releasing the braking and letting out the control line and reopening the vent.

35. The method of claim 34, including the steps of completely releasing the braking, letting out the control line, completely opening the canopy, and deflating the canopy.

* * * * *